(12) United States Patent
Xykis et al.

(10) Patent No.: US 12,326,130 B2
(45) Date of Patent: Jun. 10, 2025

(54) FLUID INJECTOR WITH FLAT SEALING SURFACE

(71) Applicant: Power Solutions International, Inc., Wood Dale, IL (US)

(72) Inventors: Constantine Xykis, Hartland, WI (US); Mark Damico, Island Lake, IL (US); Andy Suhy, Shelby Township, MI (US); Matthew Marek, Lombard, IL (US); Rahul Mangalore, Naperville, IL (US); Brian White, Stillwater, OK (US); Grant Stockton, Glen Ellyn, IL (US); Arkadiusz Gazdowicz, Elk Grove Village, IL (US); Greg Wanek, Skokie, IL (US)

(73) Assignee: Power Solutions International, Inc., Wood Dale, IL (US)

( * ) Notice: Subject to any disclaimer, the term of this patent is extended or adjusted under 35 U.S.C. 154(b) by 111 days.

(21) Appl. No.: 18/101,114

(22) Filed: Jan. 24, 2023

(65) Prior Publication Data
US 2024/0247630 A1  Jul. 25, 2024

(51) Int. Cl.
*F02M 61/10* (2006.01)
*F02M 61/18* (2006.01)

(52) U.S. Cl.
CPC ........ *F02M 61/10* (2013.01); *F02M 61/1886* (2013.01)

(58) Field of Classification Search
CPC ............................ F02M 61/10; F02M 61/1886
USPC ........................................................... 239/11
See application file for complete search history.

(56) References Cited

U.S. PATENT DOCUMENTS

| | | | |
|---|---|---|---|
| 4,339,082 A | 6/1982 | Radaelli et al. | |
| 4,711,400 A | 12/1987 | Radaelli et al. | |
| 5,058,810 A | 10/1991 | Bonfiglioli et al. | |
| 5,291,869 A | 3/1994 | Bennett | |
| 5,325,838 A | 7/1994 | Bennett | |

(Continued)

FOREIGN PATENT DOCUMENTS

| | | | |
|---|---|---|---|
| AT | 413135 B | * 10/2005 | ......... F02M 21/0254 |
| CN | 106762290 B | 5/2019 | |

(Continued)

OTHER PUBLICATIONS

AT-413135-B (Nov. 15, 2005) (Machine Translation) (Year: 2005).*

(Continued)

*Primary Examiner* — Mahmoud Gimie
(74) *Attorney, Agent, or Firm* — McDonnell Boehnen Hulbert & Berghoff LLP (57) ABSTRACT

A fuel injector for liquefied gaseous fuel includes a housing defining a fuel path from an inlet end to an outlet end. A nozzle is disposed at the outlet end of the housing. The nozzle includes an orifice for delivering liquid fuel from the fuel injector and forms a valve seat. A valve assembly is disposed in the housing and is configured to control flow of fuel through the orifice. The valve assembly includes a reciprocating valve body that is movable within the housing between a closed position and an open position. A valve seal is held by the valve body and is formed of an elastomeric material. The valve seal includes a flat sealing surface that faces the nozzle and is configured to contact the valve seat so as to inhibit flow of fuel through the orifice.

18 Claims, 5 Drawing Sheets

(56) References Cited

U.S. PATENT DOCUMENTS

| | | | |
|---|---|---|---|
| 5,423,303 A | 6/1995 | Bennett | |
| 5,823,446 A * | 10/1998 | Bennett | F02M 69/465 239/585.1 |
| 6,216,675 B1 | 4/2001 | Bennett | |
| 7,222,613 B2 | 5/2007 | Turner et al. | |
| 7,373,931 B2 | 5/2008 | Lennox et al. | |
| 8,671,912 B2 | 3/2014 | Eisenmenger et al. | |
| 8,925,519 B2 | 1/2015 | Kim et al. | |
| 9,422,899 B2 | 8/2016 | Kim et al. | |
| 9,581,116 B2 | 2/2017 | Mcalister | |
| 10,072,596 B2 | 9/2018 | Dames et al. | |
| 2012/0180761 A1 | 7/2012 | Gaurishankar et al. | |
| 2015/0211446 A1 | 7/2015 | Bennett | |
| 2015/0211461 A1 | 7/2015 | Shirk et al. | |

FOREIGN PATENT DOCUMENTS

| | | |
|---|---|---|
| EP | 0 348 786 A2 | 1/1990 |
| GB | 2 221 251 A | 1/1990 |
| JP | 4510871 B2 | 7/2010 |
| JP | 2012102875 A | 5/2012 |
| JP | 2022102753 A * | 7/2022 |

OTHER PUBLICATIONS

JP-2022102753-A (Kato et al.) (Jul. 7, 2022) (Machine Translation) (Year: 2022).*

Delphi Injectors, Delphi Remanufactured E3.3 Injectors, Sep. 15, 2022.

Bosch, "CNG Systems for passenger cars and light commercial vehicles", www.bosch-mobility-solutions.com, 2017.

Bosch, "Natural-gas injector", Retrieved from https://www.bosch-mobility.com/en/solutions/valves/natural-gas-injector/ on Aug. 8, 2023.

International Search Report prepared by the US Patent Office in international application No. PCT/US24/12669 dated May 15, 2024.

* cited by examiner

FLUID INJECTOR WITH FLAT SEALING SURFACE

BACKGROUND

Fuel injectors are typically used to deliver a desired amount of fuel for combustion, such as into an internal combustion engine, so that the fuel can be mixed with air and burned. The fuel injector may be part of a fuel injection system that provides fuel to the injector under pressure. To deliver fuel, typically a valve in the injector is opened so that the pressurized fuel passes through the injector.

When using liquefied gaseous fuels, where the pressure of the fuel may be very high, it is challenging to create sealing configurations that limit leakage to a sufficient level. Moreover, in view of the pressure drop that occurs when the valve is opened, portions of the fuel may boil as it passes through the valve. This further complicates the flow characteristics through the injector and can create a harsh environment for the sealing components.

Unless otherwise indicated herein, the description provided in this section is not prior art to the claims and is not admitted to be prior art by inclusion in this section.

SUMMARY

The present disclosure describes fuel injectors configured to inject liquefied gaseous fuel. Beneficially, embodiments described herein may provide improved sealing within the fuel injector and/or more consistent metering of fuel from the fuel injector.

In a first aspect, the present disclosure describes a fuel injector for liquefied gaseous fuel. The fuel injector includes a housing defining a fuel path from an inlet end to an outlet end. A nozzle is disposed at the outlet end of the housing. The nozzle includes an orifice for delivering liquid fuel from the fuel injector and forms a valve seat. A valve assembly is disposed in the housing and is configured to control flow of fuel through the orifice. The valve assembly includes a reciprocating valve body that is movable within the housing between a closed position and an open position. A valve seal is held by the valve body and is formed of an elastomeric material. The valve seal includes a flat sealing surface that faces the nozzle and is configured to contact the valve seat so as to inhibit flow of fuel through the orifice.

In an embodiment of the fuel injector, the nozzle is configured as a substantially flat plate.

In an embodiment of the fuel injector, the valve seal is disposed in a cavity within the valve body.

In an embodiment of the fuel injector, the valve seal includes a side surface that extends upward from the flat sealing surface.

In an embodiment of the fuel injector, an interior wall of the cavity of the valve body covers the side surface of the valve seal.

In an embodiment of the fuel injector, the valve seat includes an annular upward projection that surrounds the orifice and is configured to engage the flat sealing surface of the valve seal.

In an embodiment of the fuel injector, the annular upward projection is surrounded by a trough.

In an embodiment of the fuel injector, the valve seat includes a support surface surrounding the trough, and wherein the support surface is configured to limit movement of the valve body.

In an embodiment of the fuel injector, the upward projection extends higher than the support surface.

In an embodiment of the fuel injector, a slot extends outward from the trough and is configured to maintain pressurized fuel within the trough.

In an embodiment of the fuel injector, the valve body is configured to move at least 0.015 inches.

In an embodiment of the fuel injector, the fuel injector includes a return path from the valve body to the inlet end.

In an embodiment of the fuel injector, the return path surrounds an inlet portion of the fuel path.

In another aspect, the disclosure describes a method of delivering liquefied gaseous fuel from a fuel injector. The fuel injector includes a housing defining a fuel path from an inlet end to an outlet end, and a nozzle disposed at the outlet end of the housing. The nozzle forms a valve seat and includes an orifice therein. A valve assembly is disposed in the housing. The valve assembly includes a reciprocating valve body and a valve seal held by the valve body. The valve seal is formed of an elastomeric material and includes a flat sealing surface that faces the nozzle. The method includes providing pressurized liquefied gaseous fuel to the fuel injector and holding the valve body in a closed position in which the flat sealing surface contacts the valve seat of the nozzle so as to inhibit flow of fuel through the orifice. The method also includes moving the valve body away from the nozzle so as to allow liquid fuel to pass through the orifice and be delivered from the fuel injector.

In an embodiment of the method, the valve seal is disposed in a cavity within the valve body, the valve seal includes a side surface that extends upward from the flat sealing surface, and an interior wall of the cavity of the valve body covers the side surface of the valve seal.

In an embodiment of the method, the valve seat includes an annular upward projection that surrounds the orifice, and the annular upward projection presses into the flat sealing surface of the valve seal when the valve is in the closed position.

In an embodiment of the method, the valve body is moved away from the nozzle by at least 0.015 inches.

In an embodiment of the method, the method includes recirculating the fuel to the intake end along a return path so as to cool components of the fuel injector.

In an embodiment of the method, the method includes boiling the fuel within the return path.

In an embodiment of the method, the return path surrounds an inlet portion of the fuel path.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description serve to explain the principles of the disclosure. No attempt is made to show structural details of embodiments of the disclosure in more detail than may be necessary for a fundamental understanding of the embodiments of the disclosure and various ways in which it may be practiced.

DETAILED DESCRIPTION

Exemplary apparatus and systems are described herein. It should be understood that the word "exemplary" is used herein to mean "serving as an example, instance, or illustration." Any embodiment or feature described herein as "exemplary" or an "example" is not necessarily to be construed as preferred or advantageous over other embodiments or features. The exemplary embodiments described herein are not meant to be limiting. It will be readily understood that certain aspects of the disclosed apparatus and systems can be arranged and combined in a wide variety of different configurations, all of which are contemplated herein.

Figure 1:
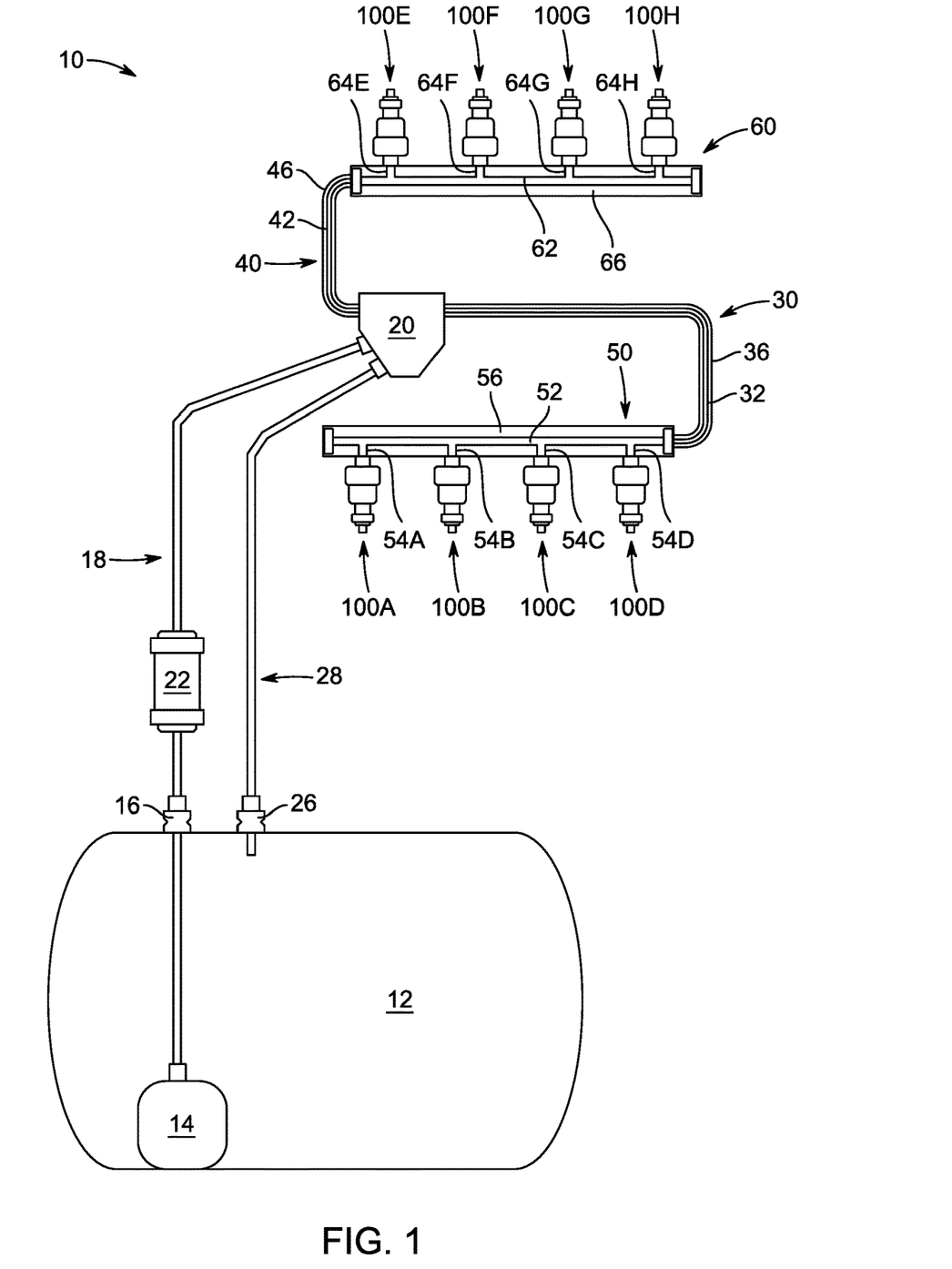
FIG. 1 is a schematic view of a fuel delivery system according to an embodiment of the disclosure.

FIG. 1 illustrates a fuel supply system 10 in accordance with one example embodiment of the disclosure. The fuel supply system 10 includes a fuel storage tank 12 and a plurality of fuel injectors 100A-100H that deliver fuel to a power generating device, such as an internal combustion engine, which is not shown for clarity. The fuel storage tank 12 may be a pressurized tank that is configured to store a liquefied gaseous fuel, such as liquefied petroleum gas (LPG) or liquefied compressed natural gas (CNG).

The liquefied fuel exits the fuel storage tank 12 through a fuel supply valve 16 and is directed toward the injectors 100A-100H via a fuel supply line 18. To drive the fuel through the fuel supply line 18 and maintain pressure at the injectors 100A-100H, the fuel supply system 10 may include a pump 14 in fluid communication with the fuel supply line 18. In the illustrated embodiment, the pump 14 has the form of an in-tank pump that is located within the fuel storage tank 12. By placing the pump 14 within the fuel storage tank 12, the pump 14 can drive the fuel through the fuel supply system 10 without requiring any pump suction, which could lead to an undesirable vaporization of the liquefied fuel in the fuel supply line. Such vaporization could lead to vapor-lock and prohibit the pump from pressurizing the fuel in the fuel supply system 10. Other pumping configurations or alternative systems for delivering fuel from the fuel storage tank are also possible.

In the illustrated embodiment, the fuel supply line 18 leads to a fuel distribution block 20 where the fuel is split and directed to two fuel rails each of which supplies four of the fuel injectors. In particular, a portion of the fuel is directed from the fuel distribution block 20 through a first fluid conduit 30 to a first fuel rail 50 while another portion of the fuel is directed from the fuel distribution block 20 through a second fluid conduit 40 to a second fuel rail 60.

Fuel supply system 10 also includes a filter 22 disposed in the supply line 18 between the fuel storage tank 12 and the fuel distribution block 20. The filter 22 may help remove contaminants from the fuel before it is supplied to the individual injectors 100A-100H. Placing a filter 22 in the fuel supply line 18 is convenient as the filter 22 can process all of the fuel that is delivered to the injectors 100A-100H and can be located in a position that is easily accessible for cleaning, maintenance, or replacement. However, other locations of a filter are also possible, such as within the pump and/or fuel storage tank, integrated into the fuel block, or within each of the conduits leading to the fuel rails. Further, the fuel supply system may include other filters throughout the system to help improve the quality of the fuel.

Fuel flowing through the supply line 18 is routed to the fuel distribution block 20, which distributes the fuel toward the first fuel rail 50 via the first fluid conduit 30 and toward the second fuel rail 60 via second fluid conduit 40, as stated above. The fuel distribution block 20 may also be used to provide an access point to the fuel. For example, the fuel distribution block 20 may include sensors that monitor characteristics of the fuel. Likewise, the fuel distribution block 20 may include a valve to access fuel within the system. In addition to directing fuel to the first fuel rail 50 and second fuel rail 60, the fuel distribution block 20 may also receive fuel from the rails for recirculating the fuel, as explained further below.

The first fuel rail 50 has a linear configuration and acts as a manifold to distribute fuel to four injectors 100A-100D. Similarly, the second fuel rail 60 also has a linear configuration and also acts as a manifold to supply fuel to an additional four injectors 100E-100H. The illustrated configuration is appropriate for an engine with two sets of cylinders, such as a V8. In other embodiments, the fuel rails may have different configurations and may supply fuel to a different number of injectors. Further, in some embodiments, the fuel supply system may have a single fuel rail or may be configured without a fuel rail.

In the illustrated fuel supply system 10 shown in FIG. 1, the system includes components for recirculating fuel that is not delivered by the fuel injectors 100A-100H. In other embodiments, the fuel injector of the disclosure may be included in systems that do not include any recirculation.

The first fuel rail 50 has a coaxial configuration with an inner supply path 52 that receives fuel from the first fluid conduit 30. From the inner supply path 52, the fuel is delivered to each of the fuel injectors 100A-100D through respective passageways 54A-54D. Any fuel that is not injected or circulated through one of the injectors 100A-100D is returned to the first fluid conduit 30 via an outer return path 56. The fuel may flow from the inner supply path 52 to the outer return path 56 through a fluid connection at the end of the first fuel rail 40 that is opposite the first fluid conduit 30. In some embodiments, the fluid connection between the inner supply path 52 and the outer return path 56 may include a valve so that the fuel only flows from the inner supply path 52 to the outer return path 56. Each of the passageways 54A-54D that extend from the inner supply path 52 to a respective fuel injector 100A-100D extends through the outer return path 56.

In the illustrated embodiment, the first fluid conduit 30 also has a coaxial construction with an inner conduit 32 that supplies fuel to the inner supply path 52 of the first fuel rail 50 and an outer conduit 36 that receives fuel from the outer return path 56 of the first fuel rail 50. The first fluid conduit 30 returns the recirculated fuel to the fuel distribution block 20 via the outer conduit 36. In other embodiments, the fuel supply system may include separate conduits that supply fuel to the first fuel rail and return fuel from the first fuel rail.

The second fuel rail 60 may also include a coaxial configuration with an inner supply path 62 and outer return path 66. Fuel accesses the fuel injectors 100E-100H via respective passageways 64E-64H that extend through the outer return path 66. Likewise, the second fluid conduit 40 may also have a coaxial construction with an inner conduit 42 that supplies fuel to the inner supply path 62 of the second fuel rail 60 and an outer conduit 46 that receives fuel from the outer return path 66 of the second fuel rail 60. The second fluid conduit 40 also returns the recirculated fuel to the fuel distribution block 20 via the outer conduit 46.

In the coaxial configurations of the first fluid conduit 30, the second fluid conduit 40, the first fuel rail 50 and the second fuel rail 60, the respective return path surrounds the supply path. Accordingly, as the fuel returns to the storage tank, the lower pressure may cause the fuel to boil, thereby drawing thermal energy from the fuel in the supply path. Thus, the fuel in the return path can provide cooling effect to the fuel in the supply path and help maintain the fuel as a liquid.

From the fuel distribution block 20, the fuel may be returned to the fuel storage tank 12 via a return line 28 and it may enter the fuel storage tank through a return valve 26. In some embodiments, the fuel supply system 10 may include a condenser that removes energy from the fuel being returned to the fuel storage tank 12.

Each of the fuel injectors 100A-100H of the fuel supply system 10 is configured to deliver fuel when opened but limit leakage when closed. As explained above, the high pressures used with liquefied gaseous fuels and the possibility of boiling the fuel within the injector both pose challenges for consistent delivery and sealing. Accordingly, each of the fuel injectors 100A-100H is configured in accordance with the present disclosure to limit leakage and improve the consistency of fuel metering.

Figure 2:
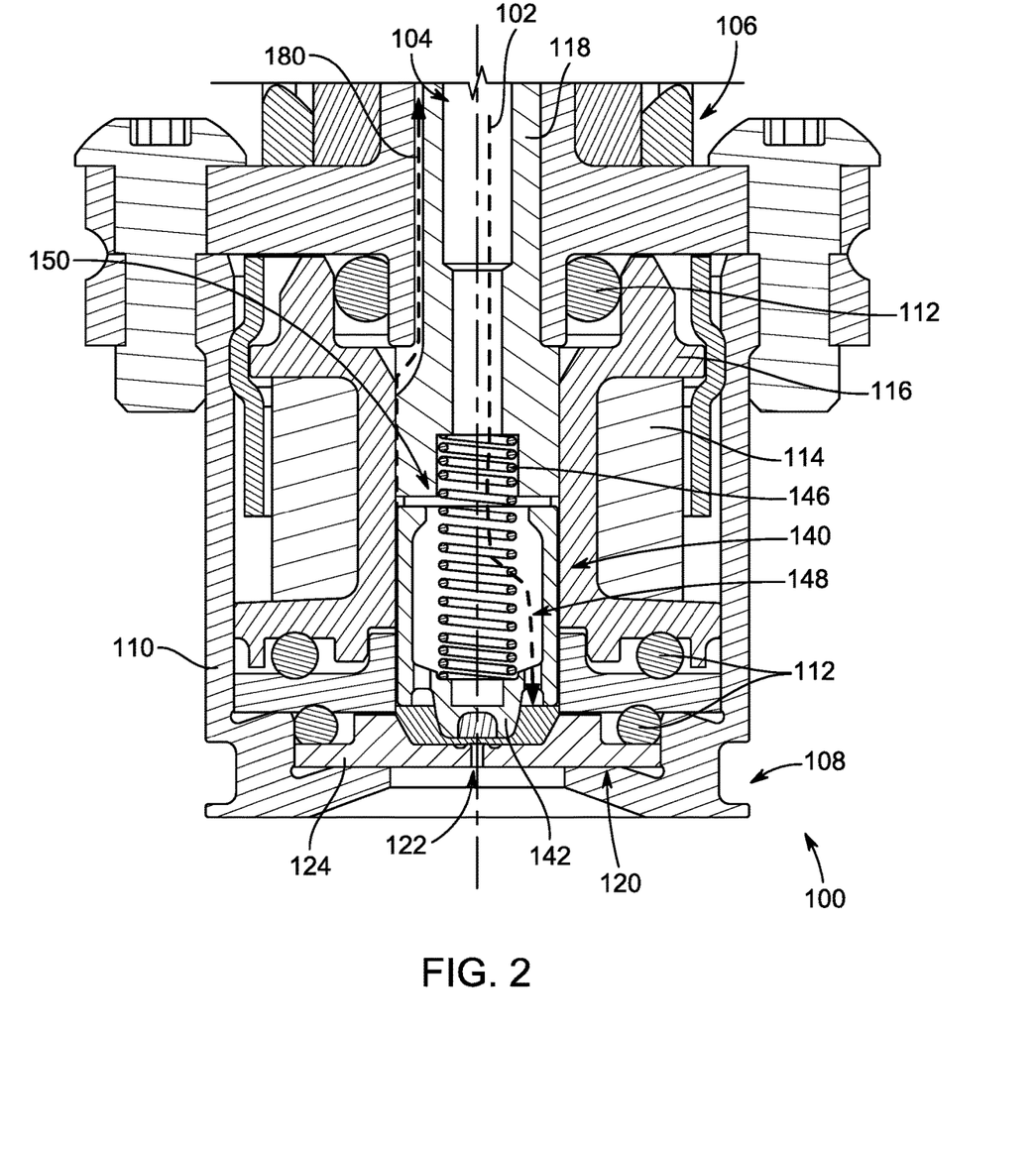
FIG. 2 is a cross-sectional side view of a fuel injector according to an embodiment of the disclosure.

FIG. 2 illustrates a portion of a fuel injector 100 in accordance with a first aspect of the disclosure. The fuel injector 100 is configured to deliver liquefied gaseous fuel to an engine. Each of the fuel injectors 100A-100H of the fuel supply system 10, shown in FIG. 1, may take the form of fuel injector 100, shown in FIG. 2. The fuel injector 100 includes a housing 110 that defines a fuel path 102 from an inlet end 106 of the housing 110 to an outlet end 108 of the 110. In some embodiments, the fuel path may extend over the entire length of the fuel injector from an inlet at the proximal tip of the fuel injector to a nozzle at the distal tip of the fuel injector. In other embodiments, the path may extend over only a portion of the length of the fuel injector. For example, in some embodiments, the fuel path may extend from a side port positioned at the inlet end of the housing to a nozzle set back from the distal tip of the housing. Thus, it should be understood that the terms inlet end and outlet end refer to the flow of the fuel and not to the structural extremities of the fuel injector or its housing.

The housing 110 of the fuel injector 100 defines the exterior of the fuel injector 100 and holds the components of the fuel injector 100 together. Specifically, the housing 110 holds the moving parts of the fuel injector 100 as well as electrical components for actuating the valve of the injector. The housing 110 is also configured to limit leakage from the fuel injector 100 and contains several seals 112 between parts of the fuel injector 100 to limit leakage from the fuel injector 100.

The fuel injector 100 also includes a nozzle 120 disposed at the outlet end 108 of the housing 110 and a valve assembly 140 disposed within the housing 110. The nozzle 120 includes an orifice 122 for delivering liquid fuel from the fuel injector 100. The nozzle 120 also forms a valve seat and receives a portion of the valve assembly 140 when the fuel injector 100 is closed. Upon activation of the valve assembly 140, fuel that is supplied to the injector 100 flows along the fuel path 102 exits the fuel injector 100 through the orifice 122 in the nozzle 120. The valve assembly 140 includes a valve body 142 that moves within the housing 110 between an open position and a closed position. When in the open position, the valve body 142 moves away from the nozzle 120 to allow the fuel to access the orifice 122 of the nozzle 120 and flow through the orifice 122. When in the closed position, the valve body 142 is seated against the nozzle 120 and restricts access to the orifice 122.

The valve body 142 of the illustrated fuel injector 100 is formed of a magnetic material and is surrounded by an electrical coil 114 that is held on a spool 116. By energizing the electrical coil 114, the valve body 142 may be moved away from the nozzle 120. The valve assembly 140 also includes a spring 146 that urges the valve body 142 toward the nozzle 120. Accordingly, when the electrical coil 114 is not energized, the valve body 142 will be sealed against the nozzle 120, thereby prohibiting flow through the orifice. In some embodiments, the fluid pressure within the fuel injector may also urge the valve body 142 toward the nozzle 120 so as to prohibit flow through the injector. In some embodiments, the flow through the orifice may be prohibited even if there is a small amount of leakage through components of the fuel injector.

While the illustrated embodiment uses an electrical coil and spring to move the valve body between open and closed positions, in other embodiments, the movement of the valve body may be driven by another configuration. For example, in some embodiments the fuel injector may include a piezo actuator. Further, in some embodiments, the valve body may be mechanically driven or actuated using another configuration.

Fuel flows into the fuel injector 100 through an inlet 104 at the inlet end 106 of the housing 110. The illustrated inlet 104 is formed by the hollow center of a cooling bushing 118, as described further below. The fuel path 102 extends through the center of the cooling bushing 118 toward the valve assembly 140. The cooling bushing 118 also holds the proximal end of the spring 146 and provides a support structure for the spring 146 so that the spring 146 may push against the valve body 142. The spring 146 is configured as a coil spring and surrounds the fuel path 102 within a lower portion of the cooling bushing 118. The terms lower and upper are used herein to describe portions of the fuel injector based on the orientation shown in the drawings. In practice, however, the fuel injector may be arranged in any orientation.

The valve body 142 of the valve assembly 140 of the illustrated embodiment has a hollow interior 148 with a central opening 150 toward on the upper side of the valve body. The spring 146 extends from the cooling bushing 118 into the hollow interior 148 of the valve body 142 through the central opening 150. At a distal end of the spring 146 it contacts a support surface 152 of the valve body 142 where the spring 146 applies a spring force to the valve body 142 urging the valve body 142 toward the nozzle 120, as described above. The fuel path 102 also extends into the hollow interior 148 of the valve body 142 through the central opening 150. Within the hollow interior 148 of the valve body 142, the fuel is directed outward from the interior of the spring 146 to the area surrounding the spring 146. In particular, the fuel is directed to flow between the gaps in the coils of the spring. While the illustrated fuel path 102 only shows a single path from the interior of the spring 146 to the exterior, the fuel flows radially outward from the interior of the spring in all directions. As explained in further detail below, the fuel flows from the hollow interior 148 of the valve body 142 through openings in the distal end of the valve body 142 toward the nozzle.

Figure 3:
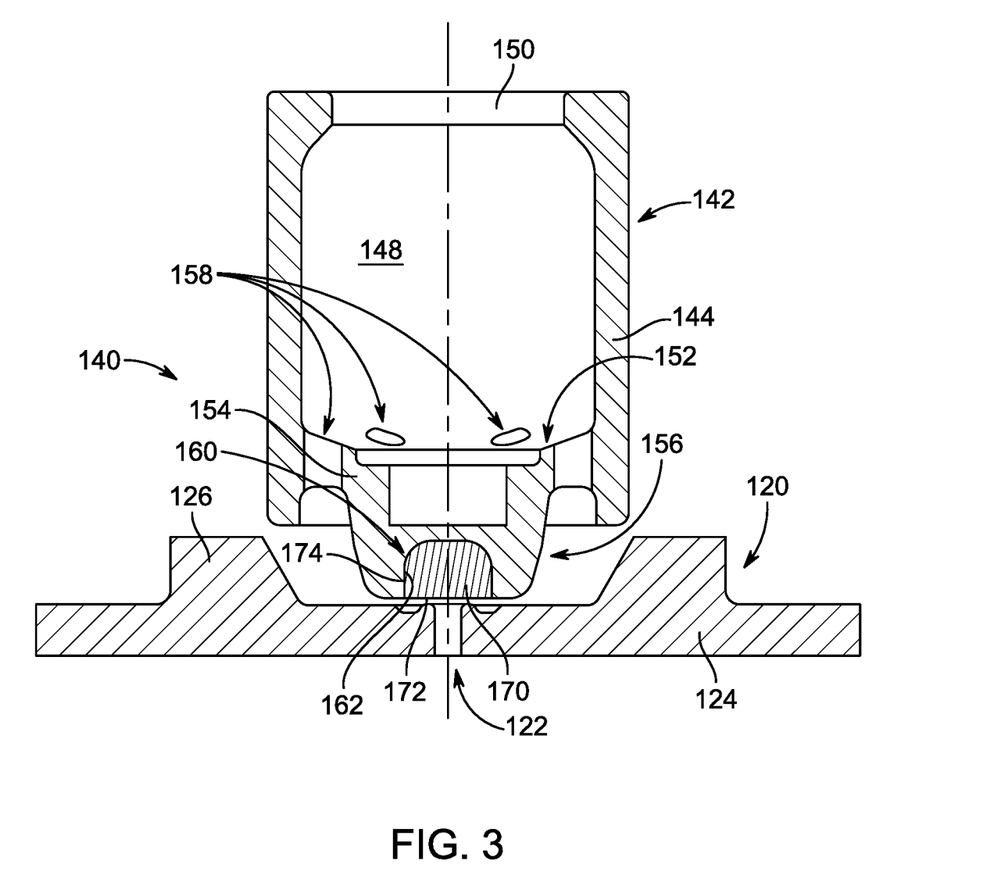
FIG. 3 is a cross-sectional view of components of the fuel injector of FIG. 2.

FIG. 3 illustrates a larger cross section of the valve body 142 and nozzle 120 in isolation. As shown, valve body 142 includes a circumferential wall 144 that surrounds hollow interior 148 and central opening 150 at the upper end of the valve body 142. The valve body 142 includes a lower wall 154 disposed inside the circumferential wall 144 at the lower end of the valve body 142 that extends across the circumference of the valve body 142. The upper side of the lower wall 154 forms the support surface 152 that holds the spring 146 (FIG. 2). The lower wall 154 also structurally supports a valve projection 156 that engages the nozzle 120 when the valve body 142 is closed. The lower wall 154 also includes a group of openings 158 that are arranged in a ring around the valve projection 156. These openings 158 allow fuel to flow from within the hollow interior 148 of the valve body 142, through the lower wall 154, and toward the nozzle 120. As mentioned above, the fuel path 102 shown in FIG. 2 is illustrated through only one of the openings 158 in the lower wall 154 as a representation of the direction that the fuel flows. In practice, the fuel will flow through each of the openings 158 around the valve projection 156. In other embodiments, the fuel path through the injector may follow a different route. For example, in some embodiments, the fuel may flow around the valve body.

The valve assembly 140 also includes a valve seal 170 that is secured to the lower end of the valve body 142 and is configured to engage the nozzle 120. When the electrical coil 114 is not energized and the spring 146 (FIG. 2) is urging the valve body 140 toward the nozzle 120, the valve seal 170 contacts the nozzle 120 and inhibits the flow of fuel through the orifice 122. The valve seal 170 may be formed of an elastomeric material, such as a rubber material, so that the valve seal 170 can conform to a corresponding surface of the nozzle 120 and form a continuous seal around the orifice 122.

The valve seal 170 has a flat sealing surface 172 that faces the nozzle 120 and is the portion of valve seal 170 that is configured to engage the nozzle 120. The use of a flat sealing surface 172 may provide several advantages to the fuel injector 100. First, as the valve body 142 moves away from the flat sealing surface 172, it is less likely than other shapes to influence the flow path of fuel flowing toward and through the orifice 122 of the nozzle 120. Further, the flat shape of the sealing surface may render it less vulnerable to wear resulting from the fuel flowing through the injector than a sealing surface that includes curves or corners. In addition, the flat shape of the sealing surface 172 may simplify manufacturing. Further, the flat sealing surface 172 may engage the nozzle 120 in the same manner even if the valve body 142 and nozzle 120 are slightly misaligned. Thus, while an offset between the radial alignment of the valve body 142 and the nozzle 120 may result in other complications, it may not directly influence the seal that is formed between the sealing surface 172 and the nozzle 120.

The term "flat," as used herein with respect to the sealing surface, means substantially planar and excluding any intentional curvature oriented around the axis of the injector. However, in view of manufacturing limitations, the sealing surface may not be perfectly flat. Thus, in some embodiments, the term flat may include surfaces that are flat to within 0.002 inches.

In some embodiments, the nozzle s configured as a substantially flat plate. For example, nozzle 120, as shown in FIG. 2, includes a circular flat body 124 that is held at the distal end of the housing 110. The nozzle body 124 extends across the width of the housing 110 substantially covers. Accordingly, the outlet from the fuel injector 100 is formed by the orifice 122 of the nozzle 120, rather than the housing 110 itself. As shown in FIG. 3, the orifice 122 is positioned at the center of the nozzle body 124 and is surrounded by a circumferential wall 126 that extends upward from an inner surface 128 of the nozzle body 124. The area within the circumferential wall 126 forms the valve seat of the nozzle 120 and is configured to receive the valve body 142.

In some embodiments, the valve seal is disposed in a cavity within the valve body. For example, in the depicted embodiment, the valve body 142 includes a cavity 160 disposed within the valve projection 156 and the valve seal 170 is positioned within the cavity 160. The use of the cavity 160 provides a structure to receive the valve seal 170 and an increased surface for securing the valve seal 170 in place. For example, the valve seal 170 may be adhered or otherwise attached to the surface of valve body 142 and by configuring the valve seal 170 to be positioned within the cavity 160, the area of contact between the valve seal 170 and the valve body 142 may extend over the entire interior of the cavity 160. Such a configuration may provide more contacting surface area than if the valve seal were attached to an outer surface of the valve body, for example. Furthermore, in some embodiments, the cavity may be shaped to mechanically hold the valve seal within the cavity. For example, the cavity may have a constricted opening that is smaller than the width of the valve seal. Accordingly, if the valve seal is compressed and inserted into the cavity, the shape of the cavity may help retain the valve seal on the valve body.

Alternatively, in some embodiments, the valve seal may not be disposed inside a cavity. For example, in some embodiments, the valve seal may be formed by a layer of elastomeric material that is adhered to a surface of the valve body. Further still, in some embodiments, the valve seal may be formed as a cap that surrounds a structure of the valve body. For instance, the valve seal, rather than the valve projection, may include a cavity, and the valve projection may form a plug that is received in the cavity of the valve seal. Other configurations are also possible.

In some embodiments, the valve seal includes a side surface that extends upward from the flat sealing surface and is secured to the cavity. For example, as shown in FIG. 3, in the depicted embodiment of the fuel injector 100, the bottom of the valve seal 170 forms the flat sealing surface 172 and is surrounded by a circumferential side surface 174 that extends upward from the outer edge of the flat sealing surface 172. In other words, the side surface 174 of the valve seal 170 is immediately adjacent to the sealing surface 172.

In some embodiments, the side surface extends into the cavity and is attached to an interior wall of the cavity. For example at least a portion of the side surface of the valve seal and an interior wall of the cavity of the valve body may be adhered or otherwise attached to one another in order to secure the valve seal to the valve body. Further, in some embodiments, the interior wall of the cavity of the valve body covers the side surface of the valve seal. For example, as shown in FIG. 3, the valve seal 170 is positioned within the cavity 160 such that the side surface 174 of the valve seal 170 is covered by the interior wall 162 of the cavity 160. The term "covered," as used herein, refers to the positioning of the interior wall 162 of the cavity 160 around the valve seal 170 such that the side surface 174 is not exposed. In the depicted embodiment, the lower edge of the interior wall 162 of the cavity 160 and the lower edge of the side surface 174 of the valve seal 170 are aligned so that the flat sealing surface 172 of the valve seal 170 is flush with a lower surface of the valve projection 156. However, in other embodiments, the valve seal 170 could be set back within the cavity 160 but still have the side surface 174 covered by the interior wall 162 of the cavity 160. On the other hand, in an embodiment where the valve seal 170 projects outward from the cavity, the side surface 174 of the valve seal 170 may not be covered by interior wall 162 of the cavity 160.

Figure 4A:
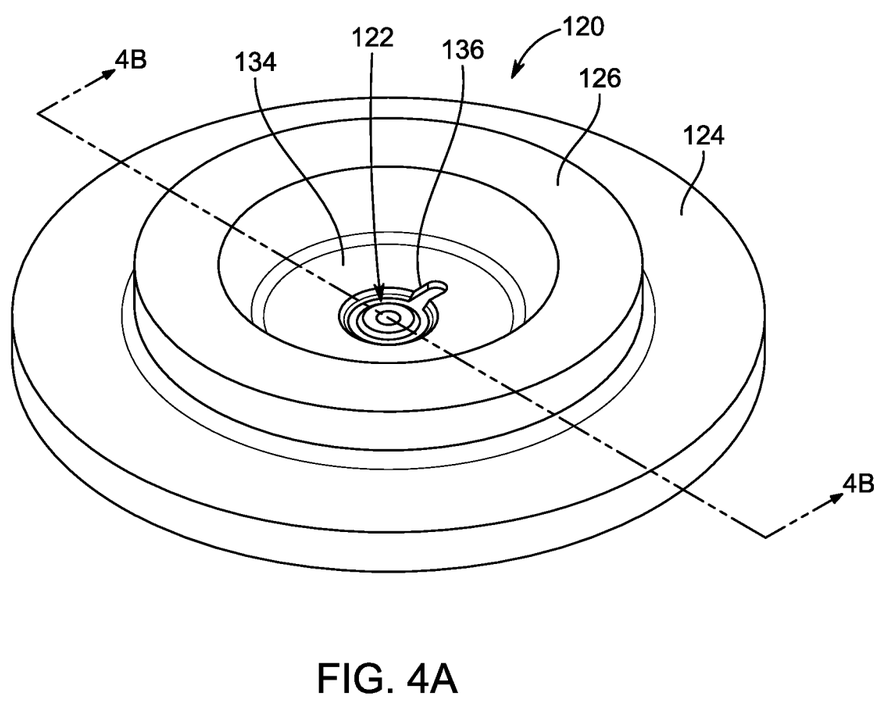
FIG. 4A is a perspective view of a nozzle of the fuel injector of FIG. 2.
Figure 4B:
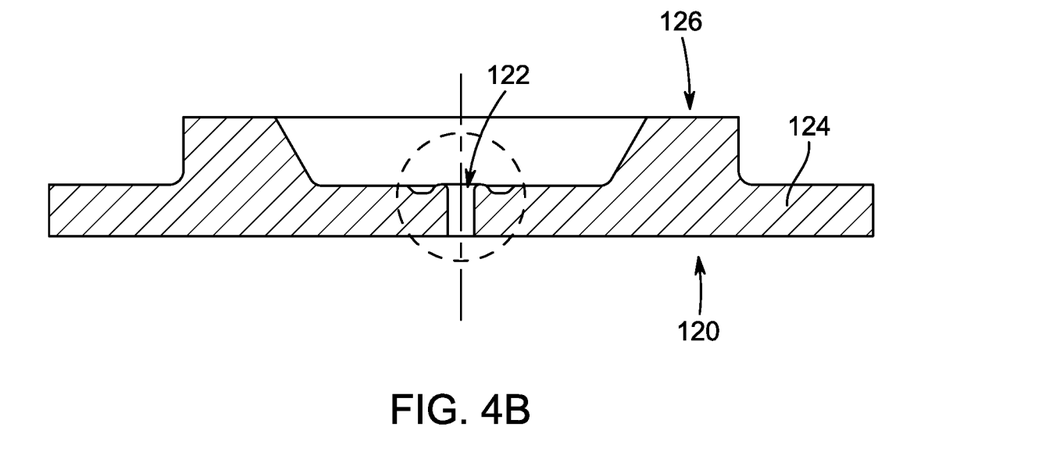
FIG. 4B is a cross-sectional side view of the nozzle of FIG. 4A.
Figure 4C:
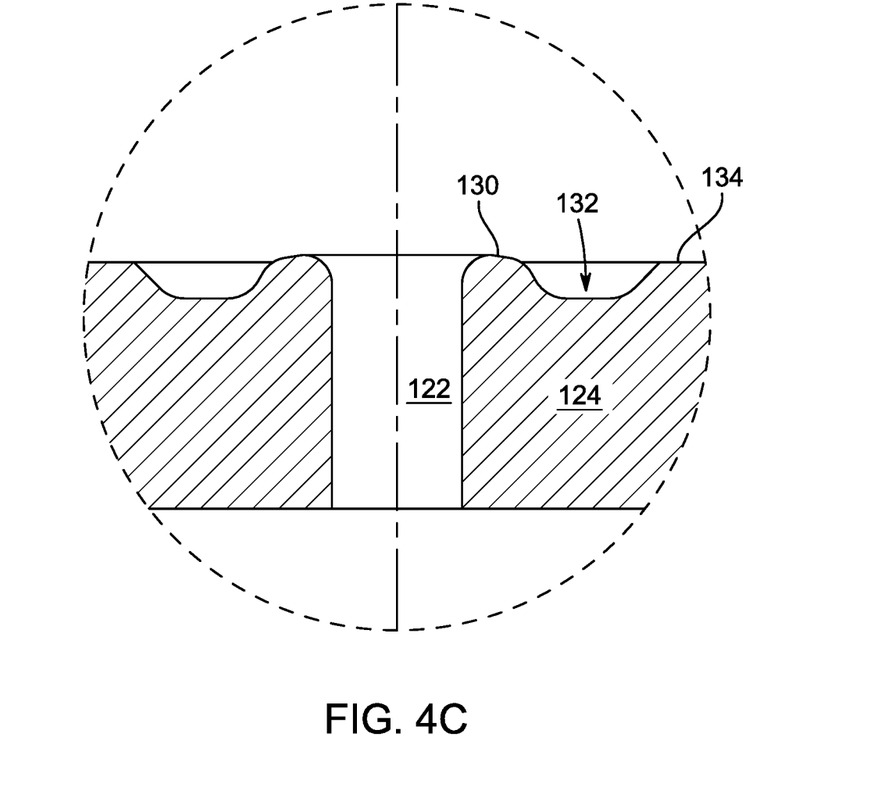
FIG. 4C is a detailed view of a portion of the cross-sectional view of FIG. 4B.

FIGS. 4A-4C show further details of the nozzle 120 of the illustrated fuel injector. As shown in FIG. 4A and described above, the nozzle 120 is formed by a circular flat nozzle body 124 and a circumferential wall 126 that extends upward from the nozzle body 124. The circumferential wall 126 forms a valve seat for receiving the valve body as explained further above. At the center of the nozzle body 124 is an orifice 122 through which fuel is delivered when the valve of the fuel injector is closed. FIG. 4B shows a cross-section taken through the nozzle 120 along line 4B-4B in FIG. 4A. A portion of the cross-section of FIG. 4B that surrounds the orifice 122 is enlarged and shown in FIG. 4C.

In some embodiments, the valve seat includes an annular upward projection that surrounds the orifice and is configured to engage the flat sealing surface of the valve seal. For example, as identified in FIG. 4C, the flat nozzle body 124 includes an annular upward projection 130 that immediately surrounds the orifice 122 of the nozzle. The annular upward projection 130 provides a structure with a defined surface that engages the flat sealing surface of the valve seal substantially uniformly around the orifice 122. This defined sealing configuration aids in forming a tight seal when the valve is closed.

In some embodiments, the annular upward projection is surrounded by a trough. For example, as shown in FIG. 4C, the nozzle body 124 of the illustrated embodiment includes a trough 132 that surrounds the annular upward projection 130. The trough 132 provides a volume of fuel around the annular upward projection 130 when the valve is closed. This may help ensure that the annular upward projection 130 is the part of the nozzle that is forming the seal with the flat sealing surface 172 of the valve seal 170. Furthermore, the trough 132 also increases the distance between the valve seal 170 and the portions of the nozzle body 124 surrounding the annular upward projection 130. For example, as can be seen in FIG. 3, the trough extends outward beyond the circumferential side surface 174 of the valve seal 170. As a result, when the valve body 142 moves to the closed position, the annular upward projection 130 is the only portion of the nozzle that is in the vicinity of the valve seal 170. This substantially limits the possibility of something other than the annular upward projection 130 forming a seal with the valve seal 170.

In some embodiments, the valve seat includes a support surface surrounding the trough, and the support surface is configured to limit movement of the valve body. For example, as shown by FIG. 3, when the area of the nozzle body 124 that surrounds the trough 132 provides a support surface 134 that receives valve projection 156 of valve body 142. Once the valve projection 156 contacts the nozzle body 124, further movement of the valve body 142 is prevented. In such a position, the valve of the fuel injector is closed and flow through the orifice 122 of the nozzle 120 is inhibited.

In some embodiments, the annular upward projection extends higher than the support surface of the nozzle. For example, as can be seen in FIG. 4C, the peak of the annular upward projection 130 is slightly higher than the support surface 134 of the nozzle body 124. Because the flat sealing surface 172 of the valve seal 170 is flush with the lower side of the valve projection 156, as show in FIG. 3, when the valve projection 156 is in contact with the support surface 134, the annular upward projection 130 presses into the flat sealing surface 172 of the valve seal 170. In some embodiments, the extent to which the annular upward projection 130 extends above the support surface 134 is in a range between 0.0005 and 0.004 inches.

In some embodiments, a slot extends outward from the trough and is configured to maintain pressurized fuel within the trough. For example, as shown in FIG. 4A, the nozzle 120 includes a slot 136 that extends through the support surface 134 of the nozzle 120. This slot 136 extends radially outward past the lateral edge of the valve projection 156 of the valve body 142 (FIG. 3). Accordingly, even when valve projection 156 contacts the support surface 134, the pressurized fluid within the fuel injector still has access to the trough 132 via the opening provided by the slot 136. As a consequence, the seal is always provided by the contact between the annular upward projection 130 and the flat sealing surface 172, rather than the contact between the valve projection 156 and the nozzle body 124.

In some embodiments, the valve body is configured to move at least 0.015 inches, which is significantly more than in other fuel injectors. Moving the valve body to such an extent may provide several advantages. When the valve is moved farther away from the orifice of the nozzle, the valve projection and the valve seal will be sufficiently remote from the orifice to avoid substantially impacting the metering through the orifice. Further, moving the valve seal away from the orifice helps limit contact between the elastomeric material of the valve seal and boiling that may occur near the vicinity of the orifice. The cold temperatures associated with the boiling of the fuel may be damaging to the elastomeric material, and removing the seal from the area of the boiling fuel may help improve the durability of the fuel injector.

In an embodiment of the fuel injector, the fuel injector includes a return path from the valve body to the inlet end. For example, as illustrated in FIG. 2, the fuel injector 100 of the illustrated embodiment includes a return path 180 that returns fuel to the respective fuel rail, where it is recirculated to the fuel storage tank, as described above. The return path 180 extends upward along the outside of the valve body 142 and around the cooling bushing 118 toward the inlet 104 of the fuel injector 100. The outside of the cooling bushing 118 may include a slot to accommodate the return path 180. By having the returning fuel surround the valve assembly 140 and cooling bushing 118, the returning fuel may help cool the supply fuel. Further, in some embodiments, the fuel may be continuously or periodically circulated through the fuel injector regardless of the activation of the fuel injector. This can help keep the fuel in the injector cool and maintain the fuel in liquid form.

In an embodiment of the fuel injector, the return path surrounds an inlet portion of the fuel path. As explained above with respect to the conduits of the fluid supply system, by having the return path surround the fuel path, the fuel in the return path can cool the fuel in the supply path. In particular, if the fuel in the return path is induced to boil, it will draw thermal energy from the fuel in the supply path, thereby helping the fuel remain in a liquid state.

In another aspect, the disclosure describes a method of delivering liquefied gaseous fuel from a fuel injector. The method includes providing pressurized liquefied gaseous fuel to the fuel injector and holding the valve body in a closed position in which the flat sealing surface contacts the valve seat of the nozzle so as to inhibit flow of fuel through the orifice. The method also includes moving the valve body away from the nozzle so as to allow liquid fuel to pass through the orifice and be delivered from the fuel injector.

For example, such a method may be performed using the fuel supply system 10 of FIG. 1. Pressurized liquefied gaseous fuel is routed from the fuel storage tank 12 through the fuel supply line 18, fuel distribution block 20, fluid conduits 30, 40, and fuel rails 50, 60, to the fuel injectors 100A-100H. Each of the injectors 100A-100H have the same configuration of fuel injector 100 shown in FIGS. 2-4C. In the method, the valve body 142 of the valve assembly 140 is held closed by the spring 146, possibly with the assistance of fluid pressure within the injector. With the valve body 142 held closed, the flat sealing surface 172 of the valve seal 170 contacts the valve seat of the nozzle 120, which inhibits the flow of fuel through the orifice 122. To deliver fuel from the injector, the electrical coil 114 of the fuel injector 100 is energized, which moves the valve body 142 away from the nozzle 120. This movement allows the liquid fuel in the system 10 to pass through the orifice 122 and be delivered from the fuel injector 100.

Examples given above are merely illustrative and are not meant to be an exhaustive list of all possible embodiments, applications or modifications of the invention. Thus, various modifications and variations of the described apparatus and systems will be apparent to those skilled in the art without departing from the scope and spirit of the disclosure. Although the disclosure has been described in connection with specific embodiments, it should be understood that the claims should not be unduly limited to such specific embodiments.

The terminology used herein is used for the purpose of describing particular embodiments only, and is not intended to limit the scope of the invention. It also is to be noted that, as used herein and in the appended claims, the singular forms "a," "an," and "the" include the plural reference unless the context clearly dictates otherwise. Thus, for example, a reference to "an injector" is a reference to one or more injectors and equivalents thereof known to those skilled in the art.

Unless defined otherwise, all technical and scientific terms used herein have the same meanings as commonly understood by one of ordinary skill in the art to which the invention pertains. It should be noted that the features illustrated in the drawings are not necessarily drawn to scale, and features of one embodiment may be employed with other embodiments as the skilled artisan would recognize, even if not explicitly stated herein.

Any numerical values recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Particular apparatus, systems, and components are described, although any apparatus, systems, and components similar or equivalent to those described herein can be used in the practice of the claims.

The invention claimed is:

1. A fuel injector for liquefied gaseous fuel comprising:
   a housing defining a fuel path from an inlet end to an outlet end;
   a nozzle disposed at the outlet end of the housing, wherein the nozzle includes an orifice for delivering liquid fuel from the fuel injector and forms a valve seat; and
   a valve assembly disposed in the housing and configured to control flow of fuel through the orifice, the valve assembly comprising:
      a reciprocating valve body that is movable within the housing between a closed position and an open position, and
      a valve seal held by the valve body, wherein the valve seal is formed of an elastomeric material and includes a flat sealing surface that faces the nozzle and is configured to contact the valve seat so as to inhibit flow of fuel through the orifice,
      wherein the valve seat includes an annular upward projection that surrounds the orifice and is configured to engage the flat sealing surface of the valve seal.

2. The fuel injector of claim 1, wherein the nozzle is configured as a substantially flat plate.

3. The fuel injector of claim 1, wherein the valve seal is disposed in a cavity within the valve body.

4. The fuel injector of claim 3, wherein the valve seal includes a side surface that extends upward from the flat sealing surface.

5. The fuel injector of claim 4, wherein an interior wall of the cavity of the valve body covers the side surface of the valve seal.

6. The fuel injector of claim 1, wherein the annular upward projection is surrounded by a trough.

7. The fuel injector of claim 6, wherein the valve seat includes a support surface surrounding the trough, and wherein the support surface is configured to limit movement of the valve body.

8. The fuel injector of claim 7, wherein the upward projection extends higher than the support surface.

9. The fuel injector of claim 7, wherein a slot extends outward from the trough and is configured to maintain pressurized fuel within the trough.

10. The fuel injector of claim 1, wherein the valve body is configured to move at least 0.015 inches.

11. The fuel injector of claim 1, wherein the fuel injector includes a return path from the valve body to the inlet end.

12. The fuel injector of claim 11, wherein the return path surrounds an inlet portion of the fuel path.

13. A method of delivering liquefied gaseous fuel from a fuel injector, the method comprising:
   providing pressurized liquefied gaseous fuel to the fuel injector, the fuel injector comprising:
      a housing defining a fuel path from an inlet end to an outlet end,
      a nozzle disposed at the outlet end of the housing, the nozzle forming a valve seat and including an orifice therein, and
      a valve assembly disposed in the housing, the valve assembly including a reciprocating valve body and a valve seal held by the valve body, wherein the valve seal is formed of an elastomeric material and includes a flat sealing surface that faces the nozzle, wherein the valve seat includes an annular upward projection that surrounds the orifice, and wherein the annular upward projection presses into the flat sealing surface of the valve seal when the valve is in the closed position;

holding the valve body in a closed position in which the flat sealing surface contacts the valve seat of the nozzle so as to inhibit flow of fuel through the orifice; and moving the valve body away from the nozzle so as to allow liquid fuel to pass through the orifice and be delivered from the fuel injector.

14. The method of claim 13, wherein the valve seal is disposed in a cavity within the valve body, wherein the valve seal includes a side surface that extends upward from the flat sealing surface, and wherein an interior wall of the cavity of the valve body covers the side surface of the valve seal.

15. The method of claim 13, wherein the valve body is moved away from the nozzle by at least 0.015 inches.

16. The method of claim 13, further comprising recirculating the fuel to the intake end along a return path so as to cool components of the fuel injector.

17. The method of claim 16, further comprising boiling the fuel within the return path.

18. The method of claim 16, wherein the return path surrounds an inlet portion of the fuel path.

\* \* \* \* \*